United States Patent [19]

Sarno et al.

[11] Patent Number: 4,915,417
[45] Date of Patent: Apr. 10, 1990

[54] THERMALLY ASSEMBLED CONDUITRY

[75] Inventors: Russell J. Sarno, Tarzana, Calif.; Patrick Madormo, Highland Beach, Fla.

[73] Assignee: Flo-Control, Inc., Burbank, Calif.

[21] Appl. No.: 227,289

[22] Filed: Aug. 2, 1988

[51] Int. Cl.⁴ .............................................. F16L 47/02
[52] U.S. Cl. ...................................... 285/21; 285/93; 24/270; 24/282
[58] Field of Search ...................... 285/18, 21, 93, 242, 285/197, 317, 318, 241, 244, 252, 254, 23; 24/270, 271, 282, 284, 27, 29

[56] References Cited

U.S. PATENT DOCUMENTS

| 2,155,705 | 4/1939 | Gottwald | 24/271 |
| 2,460,667 | 2/1949 | Wurzburger | 285/21 |
| 3,237,267 | 3/1966 | Angus | 24/270 |
| 3,475,793 | 11/1969 | Oetiker | 24/271 |
| 4,480,359 | 11/1984 | Koster | 24/270 |
| 4,486,650 | 12/1984 | Bridgstock et al. | 285/21 |
| 4,508,368 | 4/1985 | Blumenkranz | 285/21 |
| 4,602,148 | 7/1986 | Ramsey | 285/280 |
| 4,684,417 | 8/1987 | Grandclement | 285/93 |
| 4,718,698 | 1/1988 | Hill | 285/21 |
| 4,770,442 | 9/1988 | Sichler | 285/21 |

FOREIGN PATENT DOCUMENTS

| 504642 | 4/1971 | Switzerland | 285/21 |
| 2181203 | 4/1987 | United Kingdom | 285/21 |

Primary Examiner—Randolph A. Reese
Assistant Examiner—Anthony Knight
Attorney, Agent, or Firm—Donald D. Mon

[57] ABSTRACT

A joinder of thermoplastic pipes. Current is passed through a coil disposed between the pipes while a clamp is applied to the joinder. The clamp exerts a prevailing force. The coil is rotatable to facilitate alignment of its leads. The current from a power supply is preferably applied for the same time period for all joinder sizes, the current being adjusted to provide correct heat for various sizes.

7 Claims, 3 Drawing Sheets

4,915,417

THERMALLY ASSEMBLED CONDUITRY

FIELD OF THE INVENTION

This invention relates to conduitry made of thermoplastic resin, and means for facilitating its installation.

BACKGROUND OF THE INVENTION

The conventional installation of piping and conduitry by means of threaded or cemented joinder is well-known. These techniques require substantial preparation and installation time, which often is justified. There are, however, many applications where if economy of labor and material cost are of serious concern, these techniques are not acceptable.

The thermal joinder of pipes made of thermoplastic resin has been adopted as a solution to the above problem for installation in which labor cost and cost of materials are of substantial importance. The householder who is installing garden sprinklers will not find this invention attractive to him, because the total cost of material is relatively small, and unit savings will as to him be inconsequential. Also, he has all day to do the job. In contrast, a contractor installing large arrays of piping finds that even marginal savings in time and material mount up to substantial cash.

The installer of presently-known thermally installed piping join abutting pipe sections with a heat coil between them. The coil is connected to a current source that generates heat to soften and locally melt the plastic material. At the same time a peripheral clamp is tightened onto the outside of the joinder to press the outer member onto the inner member. The members fuse together, and when they cool the joinder is unitary, with the coil left embedded.

By then the installer has faced several problems. For one, two electrical leads emerge from the assembly to be connected to the current source. It is troublesome and sometimes not possible to arrange for them to emerge where they are readily accessible to the installer. Then he must reach around for the leads, and especially on larger sizes, they may be too short conveniently to be connected to the current source. Whatever the situation, it requires that he bother with it, and this takes time, which costs money.

In addition, a compressive force must be exerted on the joinder so the two bodies are pressed together. Otherwise an incomplete joinder might be made. The conventional means to accomplish this is by way of a commond circular hose clamp tightened by a screw. The problem this presents is that once it is tightened, there is no follow-up as the consequence of changing circumstances unless the man stands there and does it. When the substrate material melts, the compressive forces are relieved. Then one must either assume that there will be enough residual compression from the forces that were first applied, or the installer must continually re-tighten the clamp.

Neither of these arrangements is optimal. There is a latent uncertainty in depending on a previously applied force after part of the substrate has softened or melted. The need to periodically tighten the clamp is costly.

This invention should be regarded in the context that a substantial number of these joinders are usually being set at once. It is a considerable advantage for the installer to preassemble a group of these joinders and then merely to move from one to the next to apply the necessary current. Thereafter he can leave the joinder unattended, the clamp of this invention exerting a prevailing compression while the joinder fuses and cools.

Even more conveniently, this invention enables the installer to reduce the complexities and time consumed by making it possible for all joinders of any size to consume the same length of time in the heating cycle, rather than to require longer times for larger sizes than for smaller sizes.

BRIEF DESCRIPTION OF THE INVENTION

A joinder according to this invention is accomplished in combination with a telescopic fit of the ends of a pair of pipes or tubes. One pipe has a receptacle in which a heating coil is fitted. The other pipe fits inside the coil. The coil is electrically conductive, and when current is passed through the coils, it generates heat to soften or melt the adjacent faces of the thermoplastic pipe so that a fusion results.

A peripheral clamp is applied on and tightened against the outside of the outer pipe so as to press the outer pipe against the coil and the inner pipe. According to a preferred but optional feature of this invention, the clamp is a buckle type which can be opened to receive, and closed to encircle the joinder. According to a feature of the invention, it includes means to exert a prevailing force.

According to a preferred but optional feature of the invention, before it has melted the adjacent material, the coil is freely rotatable relative to its pipe so its leads can be placed to leave the joinder at a plurality of selected locations.

According to yet another optional feature of the invention, a current source is provided which can deliver a range of selected currents, whereby to develop in a given unit of time the heat necessary to create a joinder for a plurality of joinder sizes in a constant period of time.

The above and other features of this invention will be fully understood from the following detailed description and the accompanying drawings, in which.

DETAILED DESCRIPTION OF THE INVENTION

Figure 1:
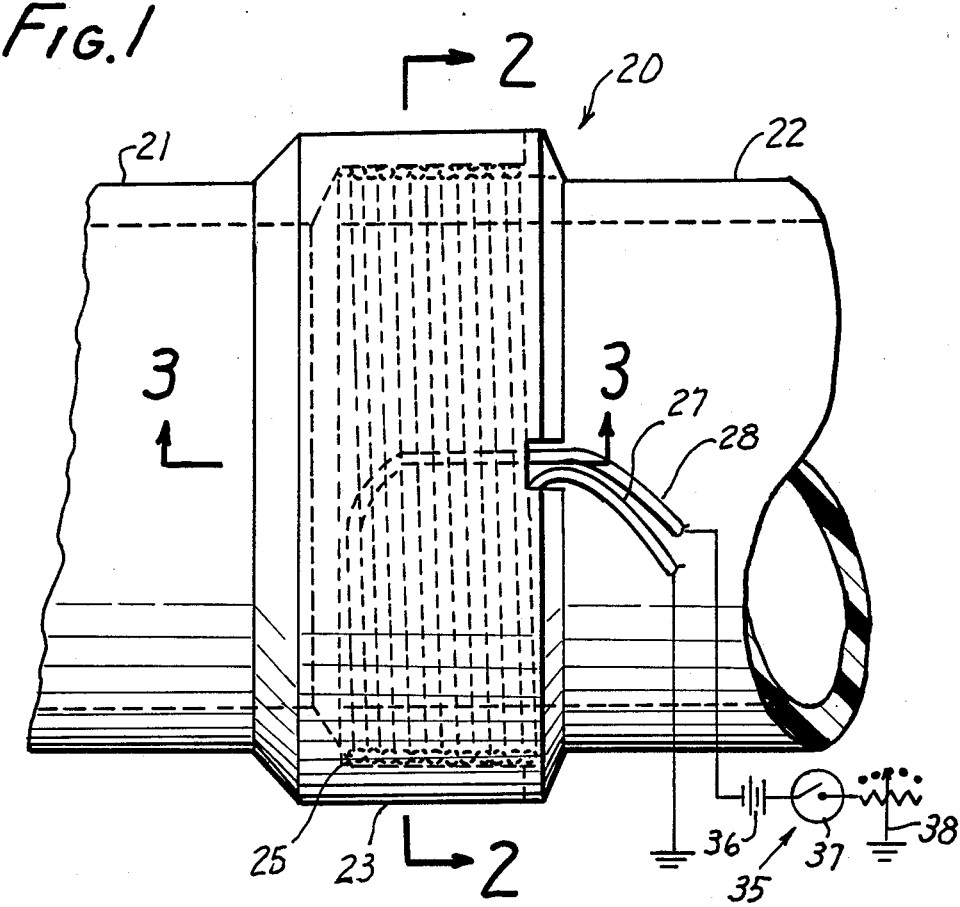
FIG. 1 is a side view, partly in schematic notation, showing the presently-preferred embodiment of the invention.

In FIG. 1 there is shown a joinder 20 of two pipes 21,22. Pipe 21 has a bellmouth end 23 to receive and fit around the cylindrical end wall 24 of pipe 22. The fit is telescopic.

A heating coil 25 is formed to a generally cylindrical shape and fits in end 23. End 23 has a group of notches 26 to pass the leads 27,28 of the coil. The coil is freely rotatable in the end 23 before the end is heated. Thus, the coil can be rotated so the leads can exit the joinder at a plurality of locations established by the notches.

Inside wall 30 of end 23, outside wall 24, and the coil make a close fit with one another.

A power supply 35 schematically shown in FIG. 1, attaches to the leads. A current source 36 such as a battery is grounded and connected to one of the leads. The power supply further includes a timer switch 37 and a rheostat 38, which is grounded.

The timer is preferably set for a pre-determined time, which is intended to be the same for all joinder sizes. The rheostat is provided with setting indicia such as to indicate the position of more amperage for larger joinder sizes than for smaller joinder sizes. Thus, in a given period of time, a sufficient current can be passed to the coil to soften or melt the material of any respective size. The current is thereby varied from size to size, but the time remains constant. This is a substantial advantage to the installer of a large number of joinders.

It is still within the scope of this invention to vary the time rather than the current. It is, however, more convenient to be able to calibrate the rheostat setting to joinder size rather than to select a time increment. The worker can move at a steadier pace.

Figure 2:
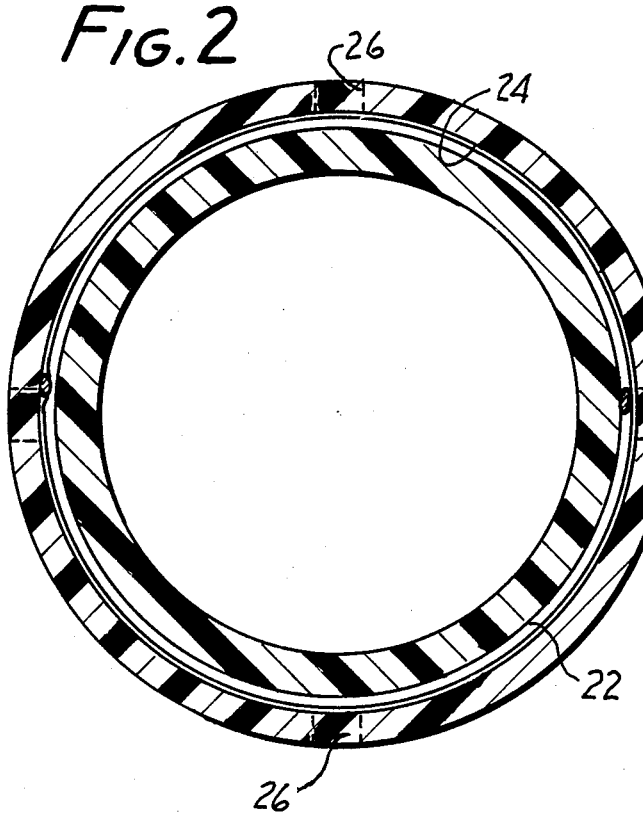
FIG. 2 is a cross-section taken at line 2—2' in FIG. 1.
Figure 3:
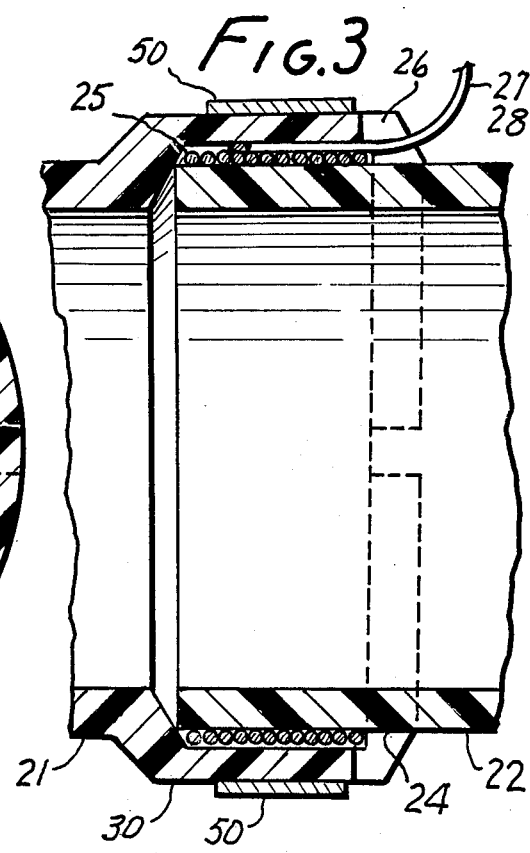
FIG. 3 is a cross-section taken at line 3—3 in FIG. 1.

FIG. 3 shows that a clamp 50 has been applied around the joinder. For clarity it is not shown in FIGS. 1 or 2. Clamp 50 may be of the type shown in either FIGS. 4 or 7, or any other clamp which exerts a prevailing force. By "prevailing" force is meant a continuing force which is exerted despite a reduction in resistance by what is being clamped. For example, a conventional screw-type hose clamp does not exert a prevailing force, because it does not follow up when the joinder softens and offers less resistance.

Further, it is a convenience in this invention for the clamp to be a separable buckle type for ease of installation and removal. A conventional screw-type hose clamp must have its strap removed from the screw mechanism, which is a time-consuming procedure.

Figure 4:
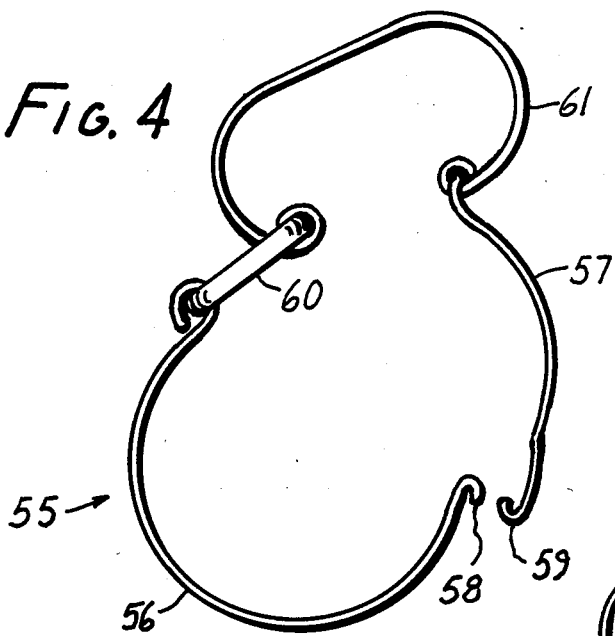
FIGS. 4, 5 and 6 are end views showing three successive positions of the preferred clamp for use with this invention.
Figure 5:
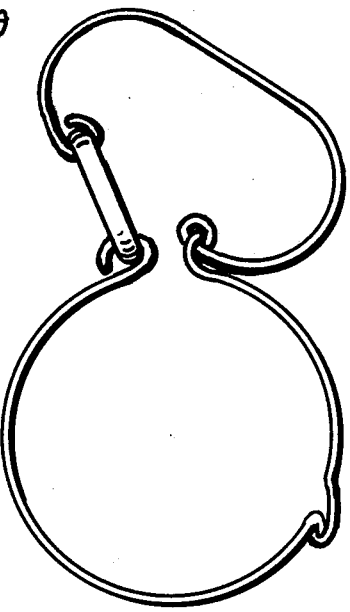
Figure 6:
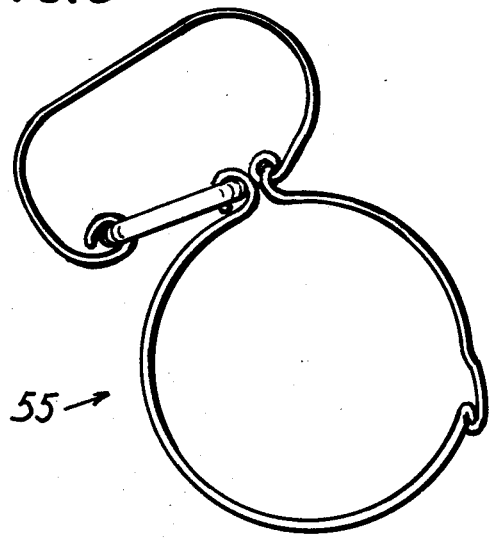

FIGS. 4-6 show a clamp 55 (symbolized by clamp 50 in FIG. 3) in which hinged-together strap segments 56,57 have end hooks 58,59 that can be separated to enable them to encircle the joinder, and be hooked together as shown in FIG. 5 to encircle it. Over center toggle 60 comprises a link that is joined to segment 56 and, through spring 61, to segment 57. Spring 61 is a curved spring-metal structure which resists the moving apart of its ends 62,63. The entire structure is conveniently made of metal, but spring 61 must be.

FIG. 4 shows the open position. FIG. 5 shows the relaxed closed position. FIG. 6 shows a stressed closed position.

It will be noted that when the clamp is moved from the position of FIG. 5 toward that of FIG. 6 the clamp will still be closed in a toggle action, but that the toggle action maintains a separate force on the spring which is resisted by the spring. As a consequence, this clamp will exert a prevailing force on a joinder to which it is clamped.

Figure 7:
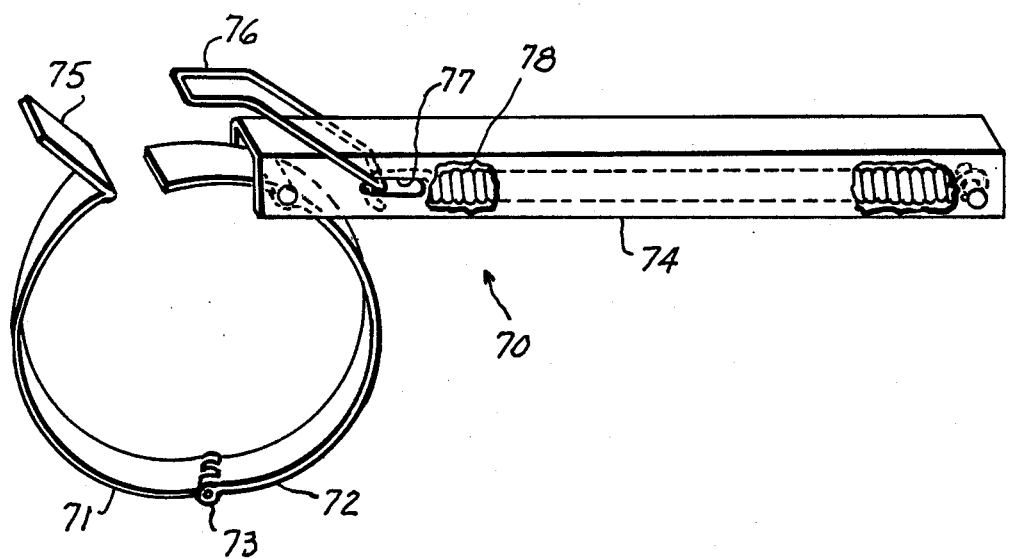
FIGS. 7 and 8 are perspective views showing another embodiment of clamp for use with this invention.
Figure 8:
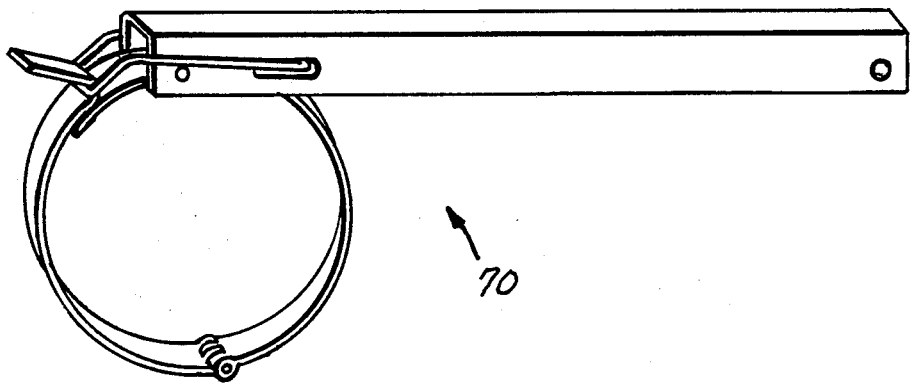

FIGS. 7 and 8 show another embodiment of a prevailing force clamp 70. It has a strap with two segments 71,72 joined by a hinge 73. Segment 72 is pinned to a housing 74. Segment 71 has a hook 75 engageable by hasp 76.

Hasp 76 slides in slots 77 in the housing. A tension spring 78 is pinned to the housing and to the hasp. When the hasp is placed over the hook, it pulls the clamp, in tension to apply a prevailing force.

It will be evident from the foregoing that the ends of the joinder can be fitted together and the coil turned to its most convenient position for access to the leads.

Either embodiment of the clamp can be opened and placed around the joinder. Closure of the clamp will result in exertion of a pre-determined prevailing force.

The power supply will be activated and current applied at the pre-determined amperage for the time appropriate to the joinder size. The joinder is heated and fused, and the timer switch turns off the current after the period of time has elapsed.

This occurs automatically, and the installer can leap frog to successive joinders. When he returns to disconnect the power supply, he may or may not remove the clamp at that time. Usually he will. It is simply unbuckled. The installation is quick, simple, and reliable. He then takes the power supply to the next joinder.

The pipes on which this process is used are customarily made of organic plastic material. Polypropylene is one useful example. The temperatures to be attained, the time duration, and current applied, and readily determined by a few trials.

This invention is not be limited by the embodiments shown in the drawings and described in the description, which are given by way of example and not of limitation, but only in accordance with the scope of the appended claims.

I claim:

1. A telescopic joinder for the ends of a pair of pipes made of rigid thermoplastic material which material is fusible by applied heat to enable surfaces of such material to fuse together when heated sufficiently to remain fused together after they have cooled, said joinder comprising:

a receptacle in one end of one of said pipes having an internal wall;

an outer wall adjacent to the end of the other of said pipes, said walls being telescopically fitted and aligned;

a heating coil disposed between said walls to heat them, said coil having a pair of leads extending from said joinder;

a clamp encircling said joinder in alignment with said walls and coil, and including spring means adapted to exert a prevailing compressive force on said joinder to press said walls together while being heated and to maintain said force substantially undiminished while being heated and cooled, said clamp further including a pair of strap segments releasably joined to one another enabling them to be separated to embrace the joinder, and to be connected together to exert said prevailing force.

2. A joinder according to claim 1 in which said coil is rotatable in said receptacle to enable selective positioning of its leads.

3. A joinder according to claim 1 in which said clamp includes a toggle, and in which said spring means is connected to said toggle and to one of said straps.

4. A joinder according to claim 2 in which said spring means is a C-spring.

5. A joinder according to claim 4 in which said strap segments are joinable to releasable hooks, one on each strap, to enable the segments to be attached and released.

6. A joinder according to claim 1 in which said clamp includes a tension spring, and a pair of hinged-together segments, one of said segments having a hook, and the other being attached to a housing for he spring, said spring tending to draw the hook toward the housing, thereby to apply a prevailing force on a pipe encircled by the strap segment.

7. In combination with a joinder according to claim 1, a power supply adapted to provide a selectable electrical current to said coil, and a timer switch adaptable to turn current on and off in the same period of time for a plurality of current settings.

* * * * *